United States Patent [19]

Delaplaine et al.

[11] 4,088,291

[45] May 9, 1978

[54] ROTARY LEVELING BASE PLATFORM

[75] Inventors: Robert W. Delaplaine, Woodside; Daniel L. Mossolani, Los Altos, both of Calif.

[73] Assignee: The United States of America as represented by the Administrator of the National Aeronautics and Space Administration, Washington, D.C.

[21] Appl. No.: 738,218

[22] Filed: Nov. 3, 1976

[51] Int. Cl.² ............................................. F16M 11/08
[52] U.S. Cl. ..................................... 248/186; 248/178
[58] Field of Search ......................... 248/23, 176–187, 248/188.2, 188.3, 188.4, 188.5, 219.2, 523, 524, 527

[56] References Cited

U.S. PATENT DOCUMENTS

| 399,345 | 3/1889 | Poehlman | 248/179 |
| 973,558 | 10/1910 | Pierce | 248/180 UX |
| 1,151,549 | 8/1915 | Schade | 248/180 |
| 3,020,016 | 2/1962 | Kingsbury | 248/183 |

FOREIGN PATENT DOCUMENTS

| 470,177 | 6/1914 | France | 248/187 |
| 605,448 | 2/1936 | France | 248/183 |
| 7,841 | 11/1879 | Germany | 248/186 |
| 881,414 | 6/1953 | Germany | 248/188.2 |
| 1,023,400 | 3/1966 | United Kingdom | 248/177 |

Primary Examiner—Lawrence J. Staab
Attorney, Agent, or Firm—Darrell G. Brekke; John R. Manning

[57] ABSTRACT

A leveling apparatus for the precise level adjustment of a scientific instrument. A base member is provided having a hollow cylindrical shape. A table for supporting the instrument rests on the base and has a shaft portion extending below the table. The upper portion of the shaft fits tightly into the hollow portion of the base member whereas the lower portion of the shaft is machined to fit loosely. The lower portion of the shaft is provided with a groove cut around the circumference thereof. Adjusting screws are threaded through the hollow cylindrical portion and are adapted to enter the groove. By adjusting the screws, the lower portion of the shaft is moved in a vertical plane since the shaft is loosely fitted into the cylinder. The upper portion of the shaft which is tightly fitted into the upper end of the cylinder causes the cylinder to deform slightly providing a fulcrum point which allows the table to be leveled in response to the adjustment of the adjusting screws.

6 Claims, 2 Drawing Figures

U.S. Patent
May 9, 1978
4,088,291
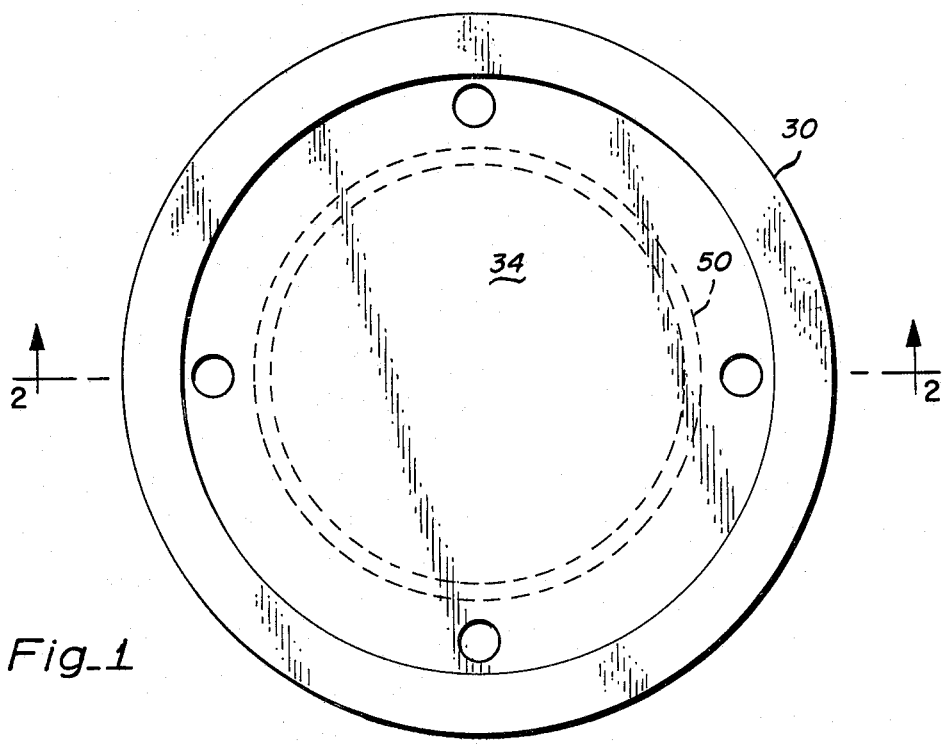
Fig_1
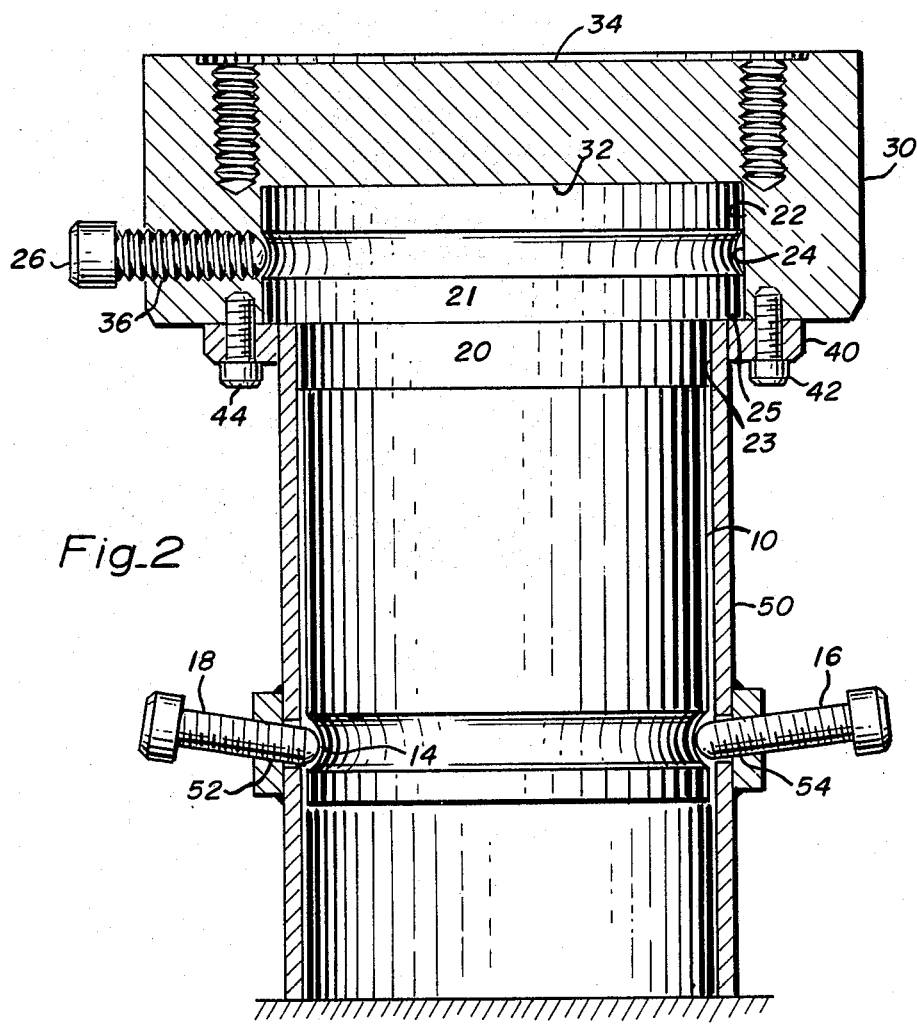
Fig_2

ROTARY LEVELING BASE PLATFORM

The invention described herein was made by employees of the U.S. Government and may be manufactured and used by or for the Government for governmental purposes without the payment of any royalties thereon or therefor.

BACKGROUND OF THE INVENTION

1. Field of the Invention

The invention relates to precision level adjusting means and more particularly to means by which a table for supporting a precision instrument can be accurately leveled.

2. Description of the Prior Art

It has been generally well-known that an instrument support can be leveled by utilizing a cylindrical member extending below the table and supported by an outer hollow cylinder into which four set screws are threaded. An example of such prior art is U.S. Pat. No. 3,588,025 to Gersman, June 28, 1971. In the Gersman patent, a ball joint structure is utilized to provide freedom of movement of the upper end of a table support where the lower end is adjusted by means of adjusting screws. This arrangement necessitated a complicated and expensive flange nut to firmly lock the apparatus in position once the adjustment is made. Furthermore, it is relatively expensive to machine a convex bearing face on the table support which abuts a complementary bearing face on the stationary support.

SUMMARY OF THE INVENTION

An object of the present invention is to provide an adjustable instrument leveling device that is inexpensive to manufacture but that is also firmly locked in position once the adjustment is made.

Briefly, the invention comprises a base support having a hollow cylindrical portion which is rigid but is susceptible to a slight deformation at its upper end. An inner member is provided with table means for supporting a piece to be leveled. The table rests on the base support and has a shaft portion extending below the table. The upper portion of the shaft is machined to tightly fit into the upper portion of the hollow cylinder. the lower portion of the shaft is machined to loosely fit into the hollow portion of the base member. The shaft is provided with a groove around the circumference thereof at its lower portion. Adjusting screw means are threaded through the hollow cylinder and into the groove. By adjusting these screws, the shaft is tilted in a vertical plane with the tightly fitting upper portion forming a fulcrum which allows the table to also be adjusted. A slight deformation in the upper portion of the hollow cylinder occurs where the inner shaft tightly fits therein.

The invention has the advantage that it is simple and inexpensive to manufacture while providing a solid adjustment which is resistant to vibration and shock.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a plan view of an embodiment of the present invention; and

FIG. 2 is a sectional view taken along the line 2—2 of FIG. 1.

DESCRIPTION OF THE PREFERRED EMBODIMENT

Referring now to FIGS. 1 and 2, a leveling base platform is shown which allows a scientific instrument to be mounted on the platform, precisely leveled with a minimum amount of adjustment, and to remain level while being rotated.

A shaft 10 is provided having an upper portion 20 with a circumference which is larger than the shaft 10. The shaft has an upper table portion 21 which is larger in circumference than the upper portion 20. The table portion 21 rests upon the open end of a hollow cylindrical steel pipe 50 which provides a base support. The upper portion 20 is machined to a close tolerance fit 23 to the inside bore of the steel pipe 50. Fitted onto the table portion 21 of the shaft 10 is a mounting plate subassembly 30. This assembly is machined so that the surface 34 which is adapted to hold an instrument to be leveled, is parallel to the surface 32 which contacts and rests upon the portion 21. The portion 21 has a locking groove 24 cut therein adapted to receive the working end of a locking bolt 26 which is screwed into a threaded hole 36 in the mounting plate assembly 30. This arrangement permits the mounting plate 30 to be rotated about the shaft 10 and locked into position by the bolt 26.

A tension ring 40 is provided which encircles the steel pipe 50 and secures the mounting plate assembly 30 to the portion 21 by means of nylon tension ring adjusting screws 42, and 44. A tight fit is maintained so that there is no motion between the part 21 and the part 30.

The shaft 10 has a leveling adjustment groove 14 cut therein adapted to receive the working end of level adjusting screws 16. Threaded holes 52, 54 are provided through the steel pipe 50, threaded at an angle to the vertical such that a downward motion is imparted by the adjusting screws 16 and 18 when they are threaded inward. This pulls the whole assembly tight against the upper open end of the steel pipe 50 to insure a snug fit.

The adjusting screws 16, and 18 function to also level the surface 34 by causing the shaft 10 to swing in a horizontal direction. While the upper portion 20 is tightly fitted to the steel pipe 50, there is some slight deformation in the steel pipe which allows the upper section 21 of the shaft to move in a vertical plane thus performing a leveling function for the whole mounting plate assembly 30.

When the adjusting screws 16, and 18 are tightened, they force the shaft 10 downwardly thus pulling the shelf 25 of the upper section 21 into a tight fitting contact with the open end of the steel pipe 50.

While the invention has been particularly shown and described with reference to a preferred embodiment thereof, it will be understood by those skilled in the art that various changes in form and detail may be made therein without departing from the spirit and scope of the invention.

What is claimed is:

1. A precision leveling apparatus comprising:
   a base support having a hollow portion and an open end;
   means provided with a table portion for supporting a piece to be leveled and having a shaft below said table portion and into the open end of said base support, an upper portion of said shaft tightly fitting into said hollow portion of said base support and a lower portion loosely fitting into said hollow portion of said base support, said table portion having a table surface that is normal to the longitudinal axis of said shaft;

said lower portion of said shaft being provided with a peripheral groove; and adjusting screws threaded through said base support so as to touch said groove;

whereby the coaction between movement of said screws and said shaft is such that said lower portion of said shaft provides a lever, and said upper portion of said shaft provides a fulcrum at the point where said upper portion meets the hollow portion of said base support to thereby cause said table surface to be moved to a horizontal plane.

2. The combination in accordance with claim 1 wherein the hollow portion of said base support is cylindrical in shape.

3. The combination in accordance with claim 1 wherein said adjusting screws are threaded in said hollow portion at a downward vertical angle such that said shaft is pulled downward when said adjusting screws are threaded inward and against said groove; and wherein said supporting means is larger than said shaft and has a shelf portion resting upon the open end of said base member to thereby tighten the fit between said shelf and said open end when said tension adjusting screws are threaded inward.

4. The combination in accordance with claim 1 wherein said table portion is cylindrical in shape, and has an annular groove cut therein; and said apparatus further comprises:

mounting means adapted to fit onto said table portion and to receive said cylindrically shaped table portion to thereby permit rotation of said mounting means about said table portion as a support; and a locking bolt threaded in said mounting means so as to enter said annular groove, whereby said mounting means is rotatable about said table portion and lockable in place by means of tightening said locking bolt against said annular groove.

5. The combination in accordance with claim 1 wherein said table portion is larger than said shaft and includes a shelf portion; and said apparatus further comprises:

mounting means adapted to fit onto said table portion and to receive said table portion, and means secured to said mounting means, overlapping the shelf portion of said table portion for holding said mounting means on said table portion.

6. The combination in accordance with claim 5 wherein said table portion is cylindrical in shape and has an annular groove cut therein; and said mounting means is adapted to fit onto said table portion and to receive said cylindrically shaped table portion to thereby permit rotation of said mounting means about said table portion as a support.

* * * * *